United States Patent [19]

Baranczyk et al.

[11] 4,367,586
[45] Jan. 11, 1983

[54] DUSTLESS CUTTER

[76] Inventors: James G. Baranczyk; Richard J. Baranczyk, both of 208 Main St., P.O. Box 211, Pulaski, Wis. 54162

[21] Appl. No.: 246,331
[22] Filed: Dec. 15, 1980
[51] Int. Cl.³ .......................................... B23D 29/00
[52] U.S. Cl. ................................................... 30/241
[58] Field of Search .................. 30/241, 242, 273, 228

[56] References Cited

U.S. PATENT DOCUMENTS

| | | | |
|---|---|---|---|
| 1,061,982 | 5/1913 | Clavans | 30/273 X |
| 1,694,597 | 12/1928 | Kelleher | 30/241 |
| 1,922,846 | 8/1933 | Gray | 30/228 X |
| 3,263,545 | 8/1966 | Leibinger | 30/228 X |
| 3,808,682 | 5/1974 | Sumida | 30/228 |
| 4,158,913 | 6/1979 | Batson | 30/241 |

Primary Examiner—Jimmy C. Peters
Attorney, Agent, or Firm—Edwin E. Greigg

[57] ABSTRACT

A motor driven reciprocating blade dustless cutter which is provided with an angular cutting edge that operates with a die in order to cut the material by a shearing action. The stroke of the cutting blade and the slope of its cutting edge is such that only a portion of the blade passes through the material as the material is sheared. During each stroke, the cutter blade shears and forces only a small portion of sheared material out through the die as a continuous strip. The strip of material is substantially the same width as that of the thickness of the cutter blade.

10 Claims, 6 Drawing Figures

DUSTLESS CUTTER

BACKGROUND OF THE INVENTION

This invention relates to portable hand-held power devices and more particularly to a portable hald-held cutting device that severs thin material with very little, if any, dust.

Heretofore portable power tools have been used for drilling holes and for sawing material. Different types of power saws have been used which make use of rotatable blades and reciprocating blades. U.S. Pat. No. 3,940,852 illustrates a reciprocating blade type and U.S. Pat. No. 4,030,387 illustrates one type of a rotating blade. U.S. Pat. No. 4,030,387 uses a single rotatable blade having cutting edges on each end of the blade. The blade has a thickness sufficient to shear the material as the blade is rotated. The cutting edges of the blade are flat and the blade is rotatable such that the shearing of the material is at an angle with respect to the material at the point of shearing as it moves through the sheet material.

OBJECT AND SUMMARY OF THE INVENTION

The present invention provides a motor driven cutter blade which is assembled such that the cutter blade reciprocates along a flat surface. The arrangement of the cutter blade is such that materials may be cut along a 90 degree angle surface. The stroke of the cutter blade and angle of the blade cutting edge is such that only a portion of the blade penetrates the material being cut or sheared, thereby shearing a small section of the material as the cutter is moved along the material. The cutter blade does not completely penetrate the material along the entire width of the cutter blade.

It is therefore an object of the invention to provide a cutter device which shears the material a little at a time while creating only minimal dust or fine particles, if any.

Another object of the invention is to provide a cutter device which may be connected to the drive shaft of an electric motor for reciprocating motion of the cutter blade.

The invention will be better understood, and further objects and advantages thereof will become more apparent from the ensuing detailed description of a preferred embodiment taken in conjunction with the drawings.

DESCRIPTION OF THE PREFERRED EMBODIMENT

Figure 1:
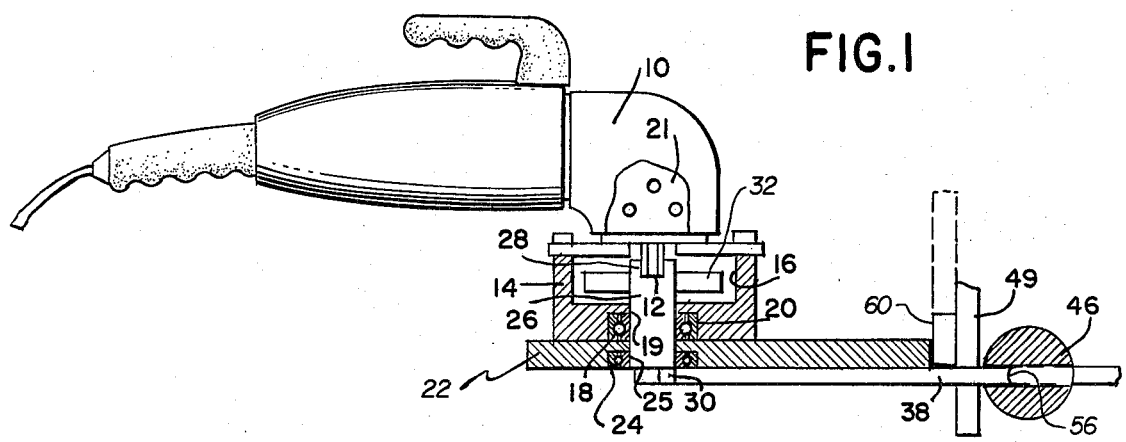
FIG. 1 shows a partial sectional view of the dustless cutter device.

Referring to the drawings, the dustless cutter makes use of any suitable commercially bought or produced direct or right angle drive motor 10, as shown. A drive shaft 12 is provided with a hexagon-shaped end protruding from the motor housing. A housing 14 having a large cutout 16 from one end and a smaller cutout 18 on the opposite end with a smaller cutout 19 therebetween is secured to the motor by any suitable means such as brackets 21 secured on opposite sides of the motor. Roller bearing 20 is pressed into the small cutout 18 and a flat smooth-faced base plate 22, made of a metal such as steel, is secured to the outer face of the housing 14. The flat base plate is provided with a cutout 24 corresponding to the cutout 18 in the housing and a smaller cutout 25 centered thereon. A bearing 20 is pressed into the cutout 24. An eccentric drive shaft 26 having a hexagon female end 28 and an off-center protrusion 30 on the other end is pressed through the bearings and the cutout 25 to a position such that the hexagon end of the eccentric drive shaft mates with the hexagon-shaped drive shaft 12 of the motor when the housing is secured to the motor. A flywheel 32 is secured on the eccentric shaft within the larger cutout 16 of the housing to smooth out the rotation of the eccentric drive shaft.

The smooth, flat-faced base plate 22 is provided with spaced parallel guide rails 34 and 36 with the center line of their spacing on a line perpendicular with the linear axis of the eccentric drive shaft. The guide rails have a portion that extends outwardly from the base with a 90 degree portion that extends parallel with the base plate and toward each other thereby forming a spacing between the flat base plate and the outer portion of the guide rails. A cutter blade 38 is placed within the guide rails for reciprocating motion and is reciprocated within the guide rails by an eccentric linkage arm 40 which connects with the cutter blade. The cutter blade is driven by the eccentric drive shaft during rotation by the motor.

The drive linkage arm is provided on one end with a rounded end 42 which matches a rounded cutout in the upper end of the cutter blade and a circular cutout 44 in its other end. The drive linkage arm is eccentrically mounted relative to the eccentric drive shaft. The round end of the linkage arm permits a rotational movement of the arm relative to the end of the cutter blade during reciprocating motion of the cutter blade.

Figure 3:
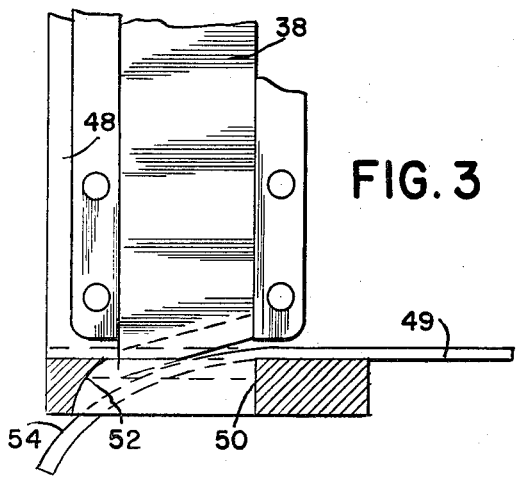
FIG. 3 illustrates the cutter blade, guide rails and cutter die with the cutter blade at its maximum stroke.
Figure 4:
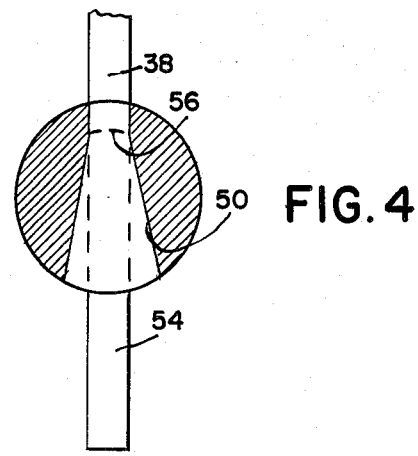
FIG. 4 illustrates the slot through the die with the cutter blade at its maximum stroke.
Figure 5:
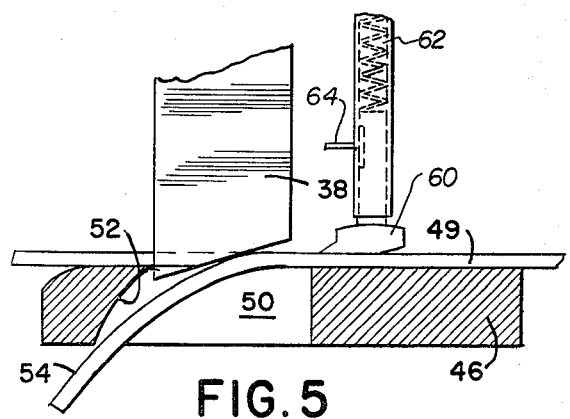
FIG. 5 is a simple illustration of the blade, material and cutter die.

A die 46 is secured below the base plate by a bracket 48 which has a thickness in the area between the edge of the base plate and the die which is no greater than the thickness of the cutter blade because that portion of the bracket must pass through the slot in the material 49 from which the material is sheared during operation. The portion of the bracket fixed to the base plate could be the same thickness as the guide rails and extend to the edges of the base plate to provide a flat surface with the guide rails. A spacer, not shown, may be added along the opposite guide rail to complete the smooth plate surface. The die is provided with a slot 50 which is slightly longer than the width of the cutter blade. The slot 50 extends completely through the die with its upper width slightly greater than that of the thickness of the cutter blade. The slot widens as it extends through the thickness of the die, as shown in FIG. 4. The back edge 52 of the slot is curved in order to curve the material 54 removed by the cutter so that it will pass out through the bottom of the slot in the die as shown in FIGS. 3 and 5.

Figure 2:
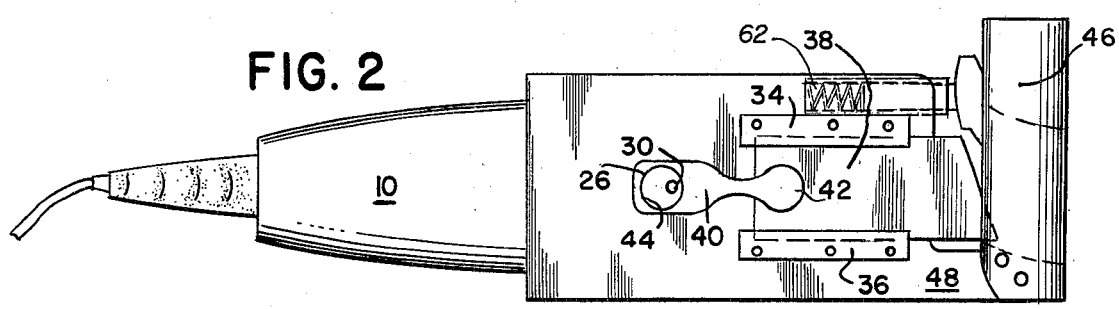
FIG. 2 shows a view looking at the cutter blade and cutter drive.

The cutter blade is of rectangular shape in cross section having a thickness of from about $\frac{1}{8}$ inches to about 5/16 inches. The cutting end of the cutter blade is concave-shaped, as shown at 56, and formed at an angle θ with respect to the direction of travel during cutting, where θ is from about 11 degrees to about 30 degrees. The slope of the cutting angle is downward from its forward edge in the direction from which the material is fed to its trailing edge as shown in FIGS. 2, 3 and 5.

The length of the cutter blade and the reciprocating stroke of the blade is such that the long side or trailing edge of the blade penetrates the material and extends downwardly a short distance into the back portion of the slot in the die. The short side or the forward edge of the cutter blade in the direction of the feed of the material does not penetrate or even contact the material to be cut. Therefore only a portion of the cutter blade penetrates the material as it is cutting the material. The concave cross-sectional shape of the cutting end permits the cutter to start cutting along the outer edges of the cut strip before the inner portions of the cut strip are cut. The full width of the cutting edge of the blade does not pass entirely through the material because of its sloped shape, as shown in FIGS. 2, 3 and 5.

Therefore it is seen that each cutting stroke of the cutter performs a partial gradual shearing action of the material. Since the material is sheared during cutting, there is no dust. The maximum up stroke (shown in dotted line) and the maximum cutting stroke are shown in FIG. 3. The concave shape of the cutter blade is shown in FIG. 4 at 56.

It is obvious that the spacing between the edge of the base plate at the cutting edge and that of the die must be sufficient to permit the material to pass, as shown more specifically in FIGS. 3 and 5.

Figure 6:
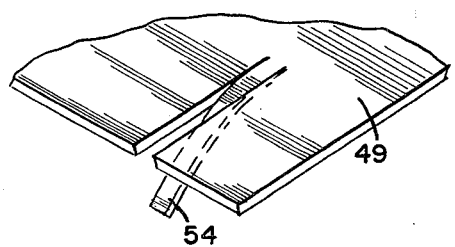
FIG. 6 shows a piece of material which has been partially cut.

FIG. 6 has been shown to illustrate a cut made into a flat piece of material with the cut strip extending downwardly therefrom.

The motor forms no part of the invention so that the dustless cutter device may be made separate from the motor and secured to any shaft drive means suitable for operation of the cutter. For portable operation, a small hand-held motor of sufficient power should be used and a support handle, not shown, may be secured to the motor side of the base plate to provide a hand support for supporting the device during its cutting operation. Therefore, the device may be held by the motor handle and the added support handle, not shown.

In use, the dustless cutter may be used above or below the material to be cut. Since the cutter blade reciprocates alongside the base plate and the base plate is flat, the cutter device may be used to cut material along a surface secured at 90 degrees relative to the material being cut. The entire width of the blade does not penetrate the material being cut; therefore, the cutter blade cuts through only a small bit each stroke of the blade. As the cutter cuts, it also bends the cut material downwardly so that the material passes out through the slot in the die. The length of the cut for each stroke cannot be of a length which is the same as the width of the cutter blade because the cutter blade does not pass entirely through the material being cut. The angle and width of the cutting end of the cutter blade and the maximum stroke of the cutter blade are such that the entire blade cutting width does not contact the material being cut.

There is also shown a hold down element or shoe 60 and spring plunger arrangement 62 including a slot and key apparatus 64, as shown in FIGS. 1, 2 and 5. The spring loaded plunger or spring loaded holding device 60-64 eliminates vibration and sustains the equipment in assisting to make for a smoother cut.

Blade thickness will vary within the purview of the invention with the thickness of the material and the amount of curvature of the cut. Of course, dimensions of the cutter may vary accordingly to the particular cutting requirements.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A dustless cutter device adapted to be connected with an electric drive motor which comprises:
   a flat cutter blade;
   an eccentric drive means for driving said flat cutter blade in a reciprocating motion;
   support means for supporting said flat cutter blade and said eccentric drive means;
   said support means including a housing with a flat plate surface,
   guide rails secured to said flat plate surface in spaced parallel relationship for guiding said flat cutter blade in a reciprocating motion relative to said flat plate surface,
   a die means secured to said flat plate surface relative to said cutter blade and spaced therefrom for passage of a sheet of material to be cut;
   said flat cutter blade having a cutting end formed at an angle relative to its direction of reciprocating motion with the slope of the angular end such that the forward edge of the cutter blade is shorter than the trailing edge; and
   said eccentric drive means and said flat cutter blade being so related that the forward edge of the cutter blade during its maximum cutting stroke will not contact the sheet of material to be cut with the trailing edge passing completely through said material to be cut.

2. A dustless cutter device as claimed in claim 1, in which:
   said angle end of said cutting end is from about 11 degrees to about 30 degrees.

3. A dustless cutter device as claimed in claim 2, wherein:
   said cutting end of said cutter blade is concave in cross section.

4. A dustless cutter device as claimed in claim 3, wherein:
   said eccentric drive means includes an eccentric drive shaft, and an eccentric drive link;
   said eccentric drive shaft supported in said housing and extends through said plate; and
   said eccentric drive link and said cutter blade are supported by said guide rails and said flat plate surface for reciprocating motion of said cutter blade relative to said eccentric drive shaft and said flat plate.

5. A dustless cutter device as claimed in claim 4, further including:
   a flywheel within said housing rotatable with said eccentric drive shaft.

6. A dustless cutter device of claim 1 wherein a spring loaded plunger holding means augments for making a smoother cut.

7. A dustless cutter device adapted to be connected with an electrically driven motor which comprises:
- a housing;
- a base plate connected with said housing perpendicular to the axis thereof and having a smooth surface opposite said housing;
- a pair of parallel cutter blade guide rails on said flat surface of said base plate;
- a cutter blade supported by said guide rails for reciprocating motion relative to said base plate;
- an eccentric drive means secured in said housing for rotation therein with its longitudinal axis perpendicular to the direction of motion of said cutter blade for operation of said cutter blade;
- a cutter die secured to said base plate relative to said cutter blade for cooperating with said cutter blade to cut a piece of material;
- said cutter blade including a cutting end having an angle relative to the direction of the reciprocating motion of said cutter blade with the cutting end angle sloping downwardly from the feed side of said cutter device; and
- eccentric linkage means between said cutter blade and said eccentric drive means for reciprocating said cutter blade.

8. A dustless cutter device as claimed in claim 7, wherein:
said cutter blade cutting end has an angle of from about 11 degrees to about 30 degrees.

9. A dustless cutter device as claimed in claim 8, in which:
the angle of the cutting end and the width of said cutter blade in combination with the maximum stroke of said cutter blade is such that the entire width of the blade does not penetrate the material to be cut during the maximum stroke of said cutter blade.

10. A dustless cutter device as claimed in claim 9, wherein:
said eccentric drive shaft includes a flywheel thereon which is rotatable therewith.

* * * * *

UNITED STATES PATENT AND TRADEMARK OFFICE
CERTIFICATE OF CORRECTION

PATENT NO. : 4,367,586
DATED : January 11, 1983
INVENTOR(S) : Richard J. Baranczyk It is certified that error appears in the above—identified patent and that said Letters Patent is hereby corrected as shown below:

Column 1, Line 6:

after portable: "hald-held" should be "-hand-held"

Signed and Sealed this

Twelfth Day of April 1983

[SEAL]

Attest:

GERALD J. MOSSINGHOFF

Attesting Officer     Commissioner of Patents and Trademarks